S. K. RADKOFF.
WINDOW DISPLAY AND ADVERTISING DEVICE.
APPLICATION FILED DEC. 9, 1916.

1,239,040.

Patented Sept. 4, 1917.
2 SHEETS—SHEET 1.

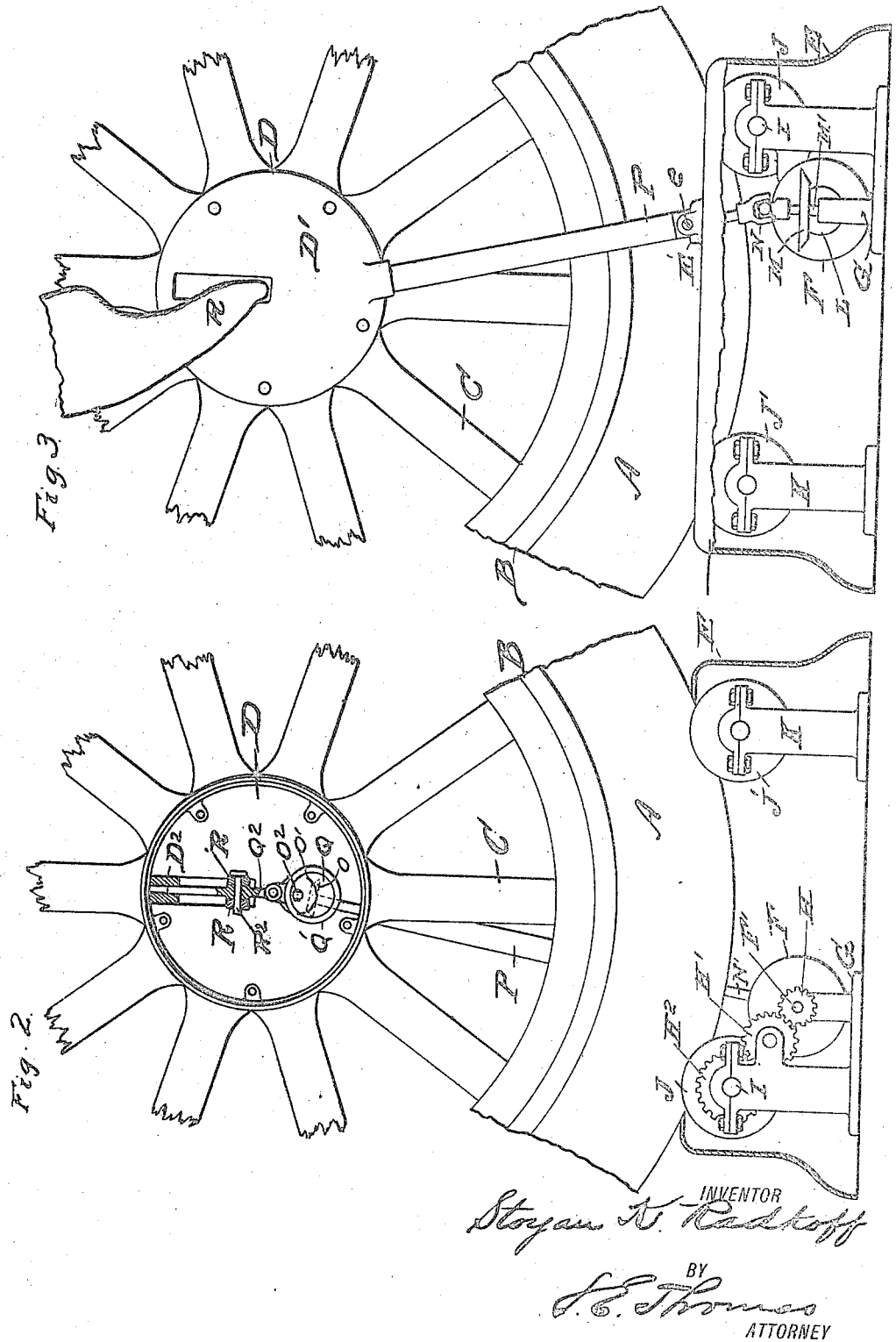

UNITED STATES PATENT OFFICE.

STOYAN K. RADKOFF, OF DETROIT, MICHIGAN.

WINDOW-DISPLAY AND ADVERTISING DEVICE.

1,239,040.         Specification of Letters Patent.      Patented Sept. 4, 1917.

Application filed December 9, 1916. Serial No. 135,966.

*To all whom it may concern:*

Be it known that I, STOYAN K. RADKOFF, a citizen of the United States, residing at Detroit, county of Wayne, State of Michigan, have invented a certain new and useful Improvement in Window-Display and Advertising Devices, and declare the following to be a full, clear, and exact description of the same, such as will enable others skilled in the art to which it pertains to make and use the same, reference being had to the accompanying drawings, which form a part of this specification.

My invention relates to advertising devices and more particularly to means for displaying and advertising automobile tires,—as shown in the accompanying drawings and more particularly described in the following specification and claims.

One of the objects of my invention is to provide a device adapted to support and rotate a tire mounted on a rim carrying spokes, from the hub of which project oscillating arms,—representing wings—actuated by a motor which also drives the mechanism employed to rotate the tire.

Another object is to provide a device in which the tread of the tire rests upon the means employed to rotate it, the driving mechanism being concealed in a suitable case adapted to rest upon the floor of a show-window front, or other like support.

With the foregoing and other objects in view which will appear as the description proceeds the invention resides in the combination of parts and details of construction hereinafter described and claimed, it being understood that changes may be made in the precise embodiment herein shown without departing from the spirit of my invention.

In the drawings accompanying this specification:—

Fig. 2 is a longitudinal sectional view through the device, showing a fragmentary portion of a tire and rim in position, to indicate its operation.

Fig. 3 is a similar longitudinal sectional view of the device as viewed from its opposite side.

Figure 1:
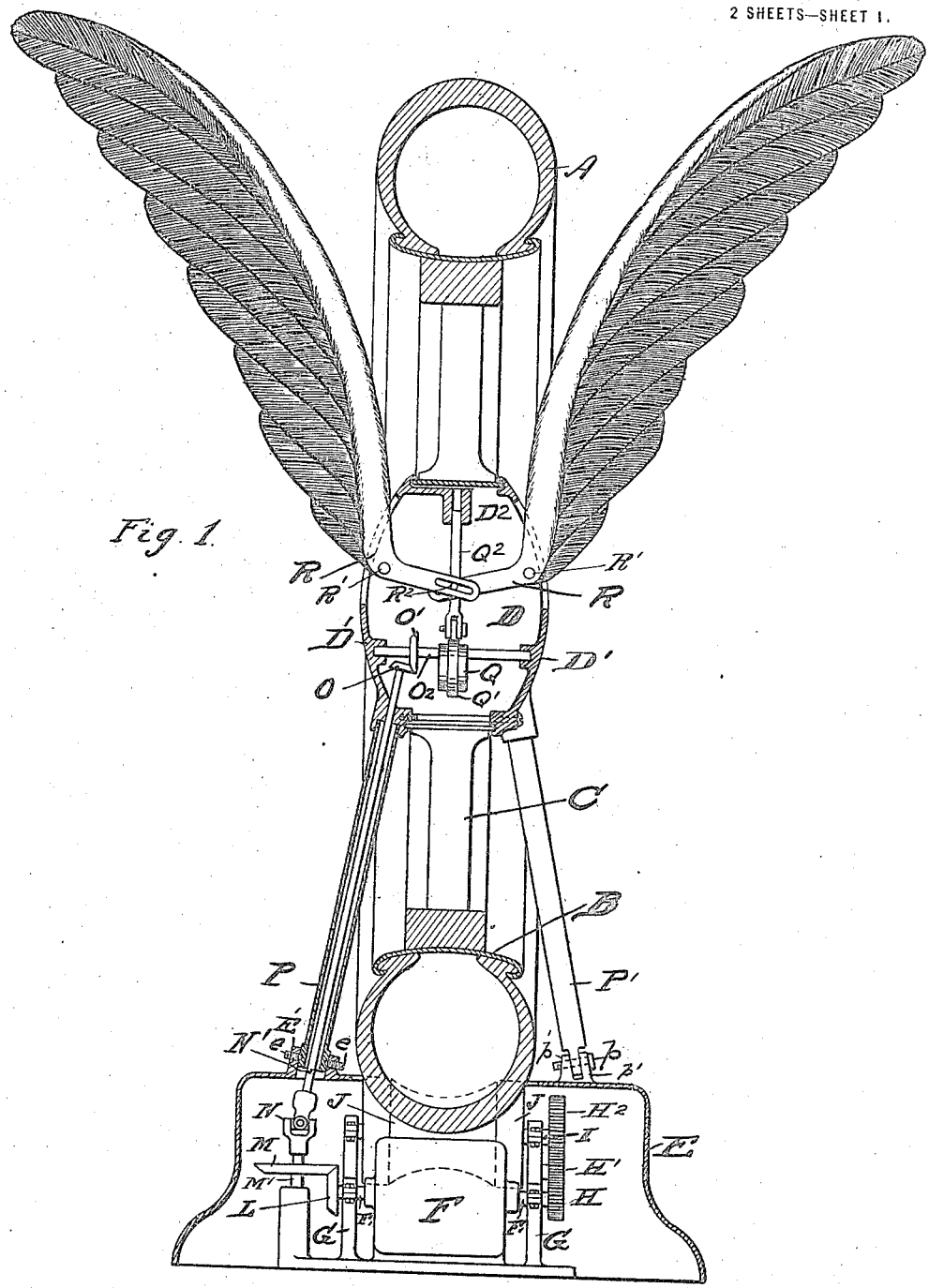
Figure 1 is a cross-sectional view through the device, with parts in elevation.

Referring now to the letters of reference placed upon the drawings:—

A, denotes an automobile or like tire casing.

B, indicates the rim on which the tire is mounted.

C, designates the spokes of a wheel, D, its hub portion. E, denotes a casing adapted to rest upon a floor like support in which is housed an electric motor F, having its armature shaft F', extending in opposite directions and journaled in the frame G.

H, is a driving pinion carried by the shaft in mesh with the intermediate gear H', in turn meshing with a gear H², on the shaft I, also journaled in the frame G. J, denotes a driving drum carried by the shaft I, on which the tire A, rests and by means of which it is rotated. J', is an idler drum journaled in a suitable supporting frame K, and serves to assist in supporting the tire.

L, denotes a bevel gear carried by the armature shaft on the opposite side of the motor, in mesh with a bevel gear M;—the shaft M', of which is also journaled in the frame G. N, indicates a universal joint connection between the shaft M', and a shaft N', which extends upwardly through the hub portion D, where it is fitted with a miter gear O, in mesh with a like gear O', carried by a shaft O², journaled in the face-plates D', of the hub portion. P, denotes a tube in which the shaft N', is sleeved, extending from a boss carried by one of the face plates D', to a hub E', in the casing E;—with which it is pivotally connected by screws e, e, projecting through the wall of the hub. P', is a tube extending from the opposite face-plate D', to the casing E, with which it is pivoted by means of the transverse pin p, carried by the lugs p', rising from the wall of the casing. The tubes P, and P', assist in supporting the hub portion with the parts contained therein and operate in conjunction therewith.

Mounted on the shaft O²,—within the hub portion,—is an eccentric Q;—Q', is its strap, and Q², a reciprocating rod connected therewith and traveling in a guide D², carried by one of the face plates D'.

R, R, denote rocker arms projecting through openings in the face-plates and pivoted at R', thereto:—the ends of the arms being slotted to receive a transverse pin R², carried by the reciprocating rod Q².

Having indicated the several parts by reference letters, the operation of the device will be readily understood.

The projecting end of the rocker arms R, R, are fashioned to represent wings and upon the motor being energized the rocker arms are actuated through the eccentric, and bevel gearing, driven by the motor, in semblance of a winged flight;—while the wheel or tire is rotated by the driving drum J, upon which it rests, thereby producing a very novel and pleasing result and serving to attract wide-spread attention.

Having thus described my invention what I claim is:—

1. In a device of the character described, a frame, a driving drum journaled in the frame, adapted to support and rotate a wheel, a motor, means actuated by the motor to operate the driving drum, rocking arms pivoted in the frame adjacent to the hub portion of the wheel, and means driven by said motor adapted to actuate said rocking arms.

2. In a device of the character described, a frame, a motor supported by the frame, a drum actuated by the motor adapted to support and rotate a wheel, the wheel, end plates in line with the hub portion of the wheel, adjustable standards for supporting the end plates, rocking arms pivoted to the end plates, and means actuated by the motor for operating the rocking arms.

3. In a device of the character described, a frame, an inclosing case, a motor housed within the case, a wheel driving drum journaled in the frame, a train of gears actuated by the motor for operating the drum, an idler drum, a wheel supported on said drums and rotated by the driving drum, plates in line with the hub portion of the wheel, standards pivoted to the case for supporting said plates, rocking arms pivoted to the plates, and suitable gearing driven by the motor for actuating said rocking arms.

In testimony whereof, I sign this specification in the presence of two witnesses.

STOYAN K. RADKOFF.

Witnesses:
S. E. THOMAS,
N. HURLEY.

Copies of this patent may be obtained for five cents each, by addressing the "Commissioner of Patents, Washington, D. C."